US012665369B2

(12) United States Patent
Budnicki et al.

(10) Patent No.: US 12,665,369 B2
(45) Date of Patent: Jun. 23, 2026

(54) OPTICAL ARRANGEMENT FOR PULSE COMPRESSION OF A PULSED LASER BEAM, AND LASER SYSTEM

(71) Applicant: TRUMPF Laser GmbH, Schramberg (DE)

(72) Inventors: Aleksander Budnicki, Waldkirch (DE); Raphael Scelle, Villingen-Schwenningen (DE); Hans-Juergen Otto, Dunningen OT Seedorf (DE)

(73) Assignee: TRUMPF LASER GMBH, Schramberg (DE)

( * ) Notice: Subject to any disclaimer, the term of this patent is extended or adjusted under 35 U.S.C. 154(b) by 643 days.

(21) Appl. No.: 18/299,726

(22) Filed: Apr. 13, 2023

(65) Prior Publication Data

US 2023/0253750 A1     Aug. 10, 2023

Related U.S. Application Data

(63) Continuation of application No. PCT/EP2021/075656, filed on Sep. 17, 2021.

(30) Foreign Application Priority Data

Oct. 19, 2020     (DE) ..................... 10 2020 213 122.8

(51) Int. Cl.
    *H01S 3/00*          (2006.01)
    *H01S 3/10*          (2006.01)
(52) U.S. Cl.
    CPC .......... *H01S 3/0057* (2013.01); *H01S 3/0071* (2013.01); *H01S 3/10053* (2013.01)

(58) Field of Classification Search
    CPC .......................... H01S 3/0057; H01S 3/10053
    See application file for complete search history.

(56) References Cited

U.S. PATENT DOCUMENTS

| | | | | |
|---|---|---|---|---|
| 3,822,943 | A | * | 7/1974 | Mason ................. G01C 15/004 |
| | | | | 356/138 |
| 5,847,863 | A | | 12/1998 | Galvanauskas et al. |
| 6,072,581 | A | | 6/2000 | Stephenson et al. |
| 8,724,207 | B1 | | 5/2014 | Andrusyak et al. |

(Continued)

FOREIGN PATENT DOCUMENTS

| | | |
|---|---|---|
| CN | 101231382 A | 7/2008 |
| CN | 100431228 C | 11/2008 |

(Continued)

OTHER PUBLICATIONS

Figueira, "Spatio-temporal distortions and propagation of wavefront aberrated beams in grating pairs" 2010, AIP Conference Proceedings, p. 150-158 (Year: 2010).*

(Continued)

*Primary Examiner* — Michael Carter

(74) *Attorney, Agent, or Firm* — LEYDIG, VOIT & MAYER, LTD.

(57)          ABSTRACT

An optical arrangement for pulse compression of a pulsed laser beam includes a grating arrangement comprising at least one diffraction grating, and a beam-expanding device comprising at least one beam-expanding optical element for forming a divergent pulsed laser beam that enters the grating arrangement divergently.

16 Claims, 3 Drawing Sheets

(56) References Cited

U.S. PATENT DOCUMENTS

| | | | |
|---|---|---|---|
| 9,385,502 B1 * | 7/2016 | Plewicki | .............. H01S 3/0057 |
| 11,205,883 B2 | 12/2021 | Budnicki et al. | |
| 2003/0189756 A1 | 10/2003 | Erbert et al. | |
| 2009/0161202 A1 | 6/2009 | Kong et al. | |
| 2012/0147908 A1 | 6/2012 | Simanovski et al. | |
| 2013/0128343 A1 | 5/2013 | Li et al. | |
| 2014/0376575 A1 | 12/2014 | Kono et al. | |
| 2017/0093111 A1 | 3/2017 | Hooker et al. | |

FOREIGN PATENT DOCUMENTS

| | | | |
|---|---|---|---|
| DE | 102016110947 A1 | 12/2017 | |
| DE | 102018109405 | * | 7/2019 |
| DE | 102018109405 B3 | 7/2019 | |
| WO | WO 2010143131 A1 | 12/2010 | |

OTHER PUBLICATIONS

Figueira Gonçalo et al,"Pulse front tilt control using non-collimated beams in a single pass grating compressor,", Optics Express, Feb. 28, 2020 (Feb. 28, 2020), pp. 7678-1690, vol. 28, No. 5, Optica Publishing Group, Washington DC, USA.
Figueira Goncalo et al. "Spatio-temporal distortions and propagation of wavefront-aberrated beams in grating pairs," AIP Conference Proceedings, May 2010, pp. 150-158, AIP Publishing LLC, Woodbury, Long Island, NY, USA.

* cited by examiner

OPTICAL ARRANGEMENT FOR PULSE COMPRESSION OF A PULSED LASER BEAM, AND LASER SYSTEM

CROSS REFERENCE TO RELATED APPLICATIONS

This application is a continuation of International Application No. PCT/EP2021/075656 (WO 2022/083950 A1), filed on Sep. 17, 2021, and claims benefit to German Patent Application No. DE 10 2020 213 122.8, filed on Oct. 19, 2020. The aforementioned applications are hereby incorporated by reference herein.

FIELD

Embodiments of the present invention relate to an optical arrangement for pulse compression of a pulsed laser beam. Embodiments of the present invention also relate to a laser system having such an optical arrangement.

BACKGROUND

Optical arrangements having a grating compressor with one or more diffraction gratings are used, for example, for pulse compression in chirped pulse amplification (CPA) systems. In a CPA system, the laser pulses of the pulsed laser beam are stretched in a stretcher, amplified in an amplifier and compressed in a compressor. Grating compressors are frequently used as compressors in a CPA system. On account of the high pulse peak power in CPA systems, a large beam diameter of the pulsed laser beam is required in the compressor in order to prevent unwanted nonlinear effects (Kerr lens) or, in a worst-case scenario, a destruction of the diffraction grating of the grating compressor. The large beam diameter requires large diffraction gratings, that is to say diffraction gratings with a large grating area, which lead to high production costs.

U.S. Pat. No. 5,847,863 has disclosed a system for amplifying ultrashort optical pulses, which system can be used for chirped pulse amplification in particular. A fibre stretcher is combined with a grating compressor in such a system. A telescope is arranged in the beam path of the collimated beam and serves the purpose of compensating a phase mismatch between the fibre stretcher and the grating compressor. By way of example, the grating compressor can be a Treacy-type grating compressor and have a first diffraction grating for beam expansion and a second diffraction grating for beam collimation.

SUMMARY

Embodiments of the present invention provide an optical arrangement for pulse compression of a pulsed laser beam. The optical arrangement includes a grating arrangement comprising at least one diffraction grating, and a beam-expanding device comprising at least one beam-expanding optical element for forming a divergent pulsed laser beam that enters the grating arrangement divergently.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1A, 1B, 2A, 2B:
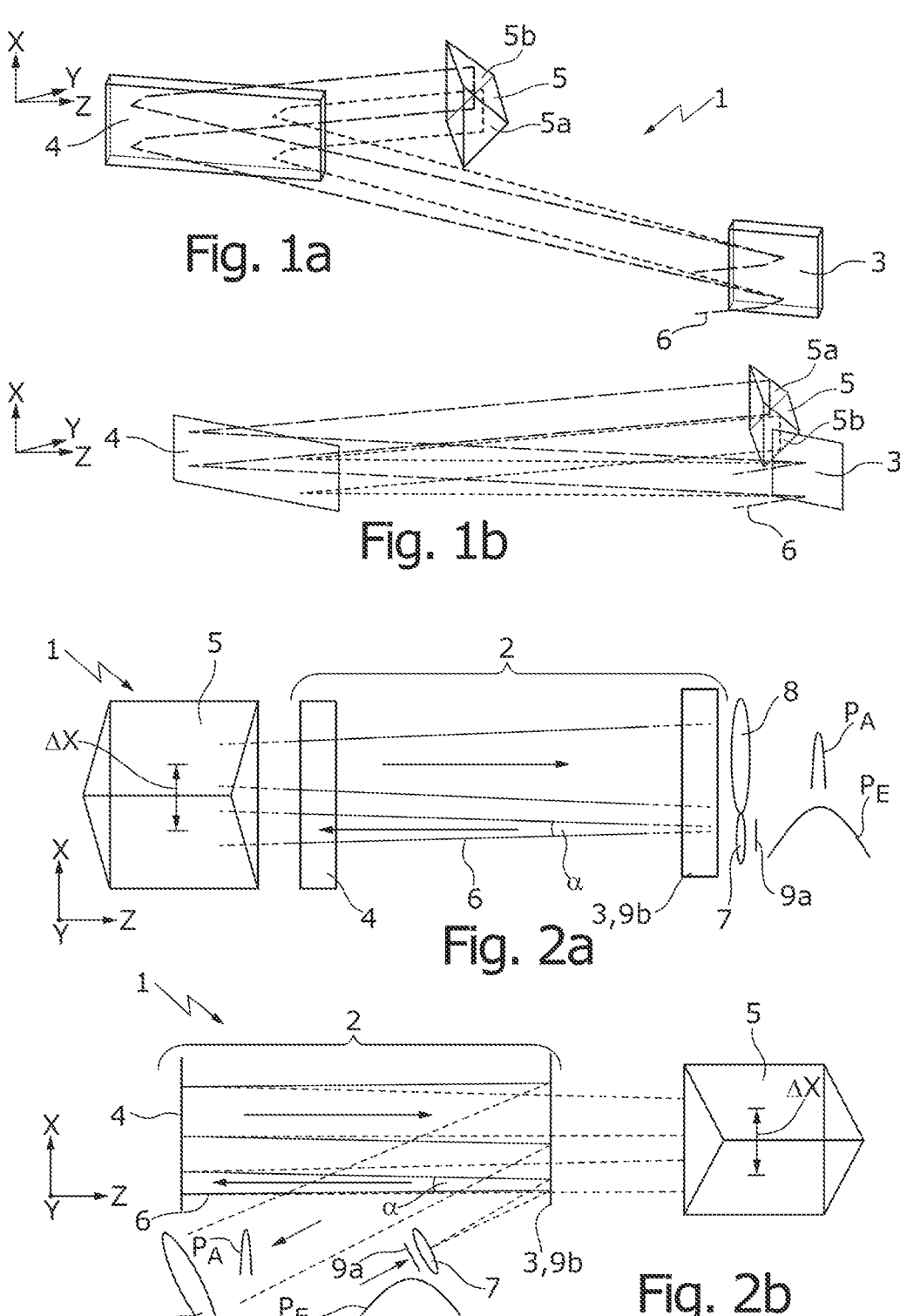
FIGS. 1a and 1b show, respectively in a plan view, schematic representations of an optical arrangement for pulse compression of a pulsed laser beam according to some embodiments, the optical arrangement having a Treacy-type grating arrangement with two transmissive or reflective diffraction gratings and a deflection device in the form of a prism.
FIGS. 2a and 2b show schematic side views of the optical arrangements in FIGS. 1a and 1b with a pulse shape of a divergent, pulsed laser beam which is produced by a beam-expanding element and which passes through the grating arrangement with the transmissive or with the reflective diffraction gratings, according to some embodiments.

Embodiments of the present invention provide an optical arrangement for pulse compression and a laser system having such an optical arrangement, which both can be realized with a compact structure even in the case of high pulse peak powers.

According to some embodiments, the optical arrangement of the type set forth at the outset, which has a beam-expanding device, in particular at least one beam-expanding optical element, for forming a divergent pulsed laser beam which, for pulse compression, enters the grating arrangement divergently and typically passes through the grating arrangement divergently. The laser beam typically maintains its divergent beam shape during the passage through the grating arrangement, that is to say the laser beam is typically neither collimated nor focused within the grating arrangement.

According to some embodiments, the pulsed laser beam is radiated into the (typically non-imaging) grating arrangement not in collimated fashion but divergently, to be precise with a divergence angle specified by the beam-expanding device. The beam-expanding device may have one or more beam-expanding optical elements, for example in the form of transmissive optical elements, for example in the form of lenses, and/or in the form of reflective optical elements, for example in the form of (curved) mirrors.

Upon entrance into the grating arrangement, that is to say when the laser beam is incident on the first diffraction grating in the beam path, the pulse duration of the pulsed laser beam still is long, and hence the pulse peak power or the peak intensity is comparatively low, with the result that, in the case of a correct design of the grating arrangement, non-linear effects can be avoided, even in the case of a comparatively small beam diameter, and there is no damage to the optical units. Therefore, the divergent laser beam typically has a small beam diameter upon entrance into the grating arrangement and requires only a small grating area at the first diffraction grating.

The pulse duration is reduced and the pulse peak power increases while the laser beam propagates through the grating arrangement, that is to say following the diffraction at the first diffraction grating. However, the corresponding increase in the peak intensity can be compensated in the case of a sufficient expansion of the divergent laser beam by virtue of increasing the grating area on which the laser beam is incident, with the result that the above-described non-linear effects are avoided and there is no damage to the optical units. In the limiting case, the required grating area of the diffraction grating or gratings of the grating arrangement can be reduced by 50% in this way. In this way, it is possible to realize a cost-effective grating arrangement with a compact structure.

In a grating arrangement for pulse compression, the laser beam is typically diffracted four times at a diffractive grating structure, to be precise along a diffraction plane or along a plurality of parallel diffraction planes. There is a spectral split and a spectral combination of the spectral components of the pulsed laser beam in a respective diffraction plane. In order to produce the four-fold diffraction, the grating arrangement may have four diffraction gratings, each of which is passed only once by the laser beam. In this case, the grating area of the diffraction gratings, from the first diffraction grating in the beam path to the fourth diffraction grating in the beam path, increases in a direction running perpendicular to the diffraction plane since the beam diameter of the divergent laser beam also increases during the propagation through the grating arrangement. The larger beam diameter, which requires a larger grating area, allows non-linear effects to be avoided and the destruction of the optical units as a result of the increasing pulse peak power can be prevented.

As a result of the laser beam divergently entering the grating arrangement, the grating area, in particular, of the first three diffraction gratings can be reduced in a direction perpendicular to the diffraction a plane in comparison with a grating arrangement into which the laser beam enters in collimated fashion. The reduction in the grating area is greatest for the first diffraction grating and reduces for the second and the third diffraction grating. At the fourth diffraction grating, the grating size perpendicular to the diffraction plane generally corresponds to the grating size of a grating arrangement with a laser beam entering the grating arrangement in collimated fashion.

As a rule, the laser beam passes at least twice through at least one of the diffraction gratings of the grating arrangement in order to reduce the number of diffraction gratings in the grating arrangement. In this case, the laser beam is incident on the diffraction grating, more precisely the diffractive grating structures of the diffraction grating, multiple times in different areas.

In an embodiment, the grating arrangement has at least one deflection device for deflecting the laser beam following the passage through at least one diffraction grating, the deflection device being designed to steer the laser beam back to the at least one already passed diffraction grating. For the deflection of the laser beam, the deflection device preferably has at least two reflection surfaces. The deflection of the laser beam with the aid of the deflection device renders it possible to pass through one and the same diffraction grating multiple times.

By way of example, the deflection device which steers the laser beam back to the (at least one) diffraction grating can be a prism, in particular a roof prism, or a plurality of prisms or prism groups. The deflection device could also be one or more mirrors, for example in the form of roof mirrors. In this case, the reflection surfaces generally are plane surfaces, at which the pulsed laser beam is reflected by way of total-internal reflection. As a rule, at least two reflection surfaces are required for reflecting the laser beam back to the at least one diffraction grating.

In a development of this embodiment, the deflection device is designed to produce a beam offset in at least one beam offset direction. The laser beam deflected at the deflection device typically runs parallel and in the opposite direction to the laser beam entering the deflection device and is offset from the entering laser beam by a given beam offset in at least one beam offset direction. As a result of the beam offset, it is possible within the scope of a renewed passage for the deflected laser beam to pass through, or be incident on, the already passed diffraction grating in a different area vis-à-vis the case during the first passage through the diffraction grating.

In the case of the deflection device or in the case of at least one of the deflection devices, the beam offset of the laser beam generally runs in a beam offset direction running perpendicular to the diffraction plane in which the laser beam is expanded and combined again by the diffraction gratings as a result of the diffraction. However, it is also possible for at least one of the deflection devices to produce a beam offset of the laser beam running in a plane parallel to the diffraction plane.

In a further development, the deflection device is designed to produce a beam offset in two beam offset directions and has at least three reflection surfaces for the deflection of the laser beam. The deflection device may have a single deflection element which comprises the (at least) three reflection surfaces. Such a deflection element typically fulfils the function of a retroreflector. The geometry of the reflection surfaces of such a deflection element is not necessarily square, as is the case for a conventional, cubic retroreflector. However, it is also possible for the three reflection surfaces to be distributed among a plurality of deflection elements of the deflection device, for example among two or more prisms which typically jointly likewise fulfil the function of a retroreflector. With the aid of such a deflection device, there can be a combined deflection of the laser beam in a beam offset direction perpendicular to the diffraction plane and additionally parallel to the diffraction plane. By way of example, such a deflection is advantageous should the grating arrangement have only a single diffraction grating.

In the case of a grating compressor or in the case of a grating arrangement, the laser beam is generally deflected in a first direction (e.g., vertically) with a first beam offset after an even number of preceding diffractions and deflected in a second direction (e.g., horizontally), which is perpendicular to the first direction, with a second beam offset in the case of an odd number of preceding diffractions. For example, in a Treacy-type grating compressor, there is a vertical deflection after two diffractions or after two diffraction gratings. In the case of a grating compressor with only a single diffraction grating, a horizontal deflection is generally implemented after the first and the third diffraction and a vertical deflection is generally implemented after the second diffraction. However, in principle, other configurations are also possible when deflecting the laser beam in the grating arrangement.

In a development, the grating arrangement has a first and a second diffraction grating, which are passed by the laser beam in succession, and the deflection device is designed to steer the laser beam back to the second diffraction grating (and also the first diffraction grating) with a beam offset which preferably runs in a beam offset direction aligned perpendicular to a diffraction plane. In this case, the first and the second diffraction grating, which typically have no imaging optical elements arranged therebetween, are passed a first time by the laser beam and are subsequently passed a second time—with a parallel offset—in the reverse direction (and with a larger beam cross section) by the laser beam which has been deflected at the deflection device.

The deflection device is typically arranged at a comparatively small distance from the second diffraction grating such that the beam cross section of the laser beam during the first passage through the second diffraction grating and the beam cross section of the laser beam during the second passage through the second diffraction grating following the deflection at the deflection device have practically virtually the same size. The areas on the second diffraction grating which are filled or required by the laser beam and by the deflected laser beam are therefore approximately the same size. The beam offset produced by the deflection device therefore typically corresponds to approximately half the height of the second diffraction grating in the beam offset direction. In the optical device described here, the two diffraction gratings, more precisely the diffractive grating structures thereof, are generally aligned parallel to one another, but this is not mandatory.

In a further development, the first diffraction grating and the second diffraction grating are arranged offset from one another by a lateral offset in a beam offset direction which runs perpendicular to a diffraction plane of the grating arrangement. For the case where no optical elements are arranged between the two diffraction gratings, a divergent laser beam or a divergent caustic generally requires the first diffraction grating and the second diffraction grating to be offset from one another in the beam offset direction in order to ensure that the centre of the beam cross section of the laser beam and the centre of the beam cross section of the deflected laser beam are each incident centrally on the area of the two diffraction gratings provided for the respective diffraction. The extent of the area provided for the respective diffraction in the beam offset direction on a respective diffraction grating increases with increasing extent of the beam cross section in the beam offset direction.

In a development, at least one further deflection device is arranged between the first diffraction grating and the second diffraction grating, the said at least one further deflection device producing a lateral offset of the laser beam in a beam offset direction which runs perpendicular to a diffraction plane of the grating arrangement. In contrast to the above-described deflection device, the further deflection device does not steer the laser beam back to the already passed diffraction grating. The further deflection device may merely produce a lateral (parallel) offset of the laser beam, which maintains its direction of propagation following the passage through the further deflection device. By way of example, this is the case when the further deflection device is embodied as a prism or as a plane-parallel plate which is arranged inclined at an angle in relation to the direction of propagation of the laser beam in order to produce the beam offset. However, it is also possible that the further deflection device is designed not only to laterally offset the laser beam but also, for example, to deflect the latter at a given angle in the diffraction plane. In this case, the two diffraction gratings are typically not aligned parallel to one another but are likewise aligned at an angle to one another in the diffraction plane.

The further deflection device may serve to produce a lateral offset which allows the centre of the beam cross section of the laser beam and the centre of the beam cross section of the deflected laser beam to be incident centrally in the beam offset direction on the area of the two diffraction gratings provided for the respective diffraction, without the two diffraction gratings having to be offset in the beam offset direction perpendicular to the diffraction plane for this purpose. In this embodiment, the two diffraction gratings can consequently be positioned level in the beam offset direction. However, it is also possible to combine a lateral offset produced by the at least one further deflection device with a lateral offset produced by an offset of the diffraction gratings in the beam offset direction.

In a further embodiment, a lateral offset between the two diffraction gratings in the beam offset direction or a lateral offset produced by the at least one further deflection device (or optionally a combined lateral offset) is given by:

$$\Delta H = 1 / 4 H_G (H_A - H_E) / (H_A + H_E),$$

where $H_G$ denotes the extent of the first diffraction grating in the beam offset direction, $H_E$ denotes the extent of the beam cross section of the laser beam in the beam offset direction during the first passage through the first diffraction grating and $H_A$ denotes the extent of the beam cross section of the deflected laser beam in the beam offset direction during the second passage through the first diffraction grating.

The lateral offset $\Delta H$ of the two diffraction gratings specified above is required in order to ensure that the centre of the beam cross section of the laser beam and the centre of the beam cross section of the deflected laser beam are incident centrally in the beam offset direction on the two diffraction gratings in an area provided for the diffraction if no deflection device or no further optical elements which produce a beam offset are arranged between the two diffraction gratings. In the case where the two diffraction gratings are arranged level with one another, the aforementioned lateral offset $\Delta H$ is produced by the (at least one) further deflection device, in order to ensure that the two beam cross sections are incident centrally in the beam offset direction on a respective area of the diffraction grating provided for the diffraction. Two further deflection devices may be used for this purpose: A first further deflection device produces a lateral offset $+\Delta H$ of the laser beam, which propagates from the first diffraction grating to the second diffraction grating, and a second further deflection device produces an equal, in terms of absolute value, but opposite lateral offset $-\Delta H$ of the deflected laser beam, which propagates from the second diffraction grating to the first diffraction grating. However, it is also possible to use a single further deflection device to this end, the said further deflection device for example being in the form of a plane-parallel plate, which is passed by the laser beam at an angle to the surface normal. In principle, it is possible to produce a first component of the lateral offset $\Delta H$ by means of the further deflection device and a second component of the lateral offset $\Delta H$ by the lateral offset of the two diffraction gratings relative to one another.

In a development of this embodiment, the at least one further deflection device is designed to produce, in addition to the lateral offset, a beam offset in the beam offset direction, this beam offset corresponding to the beam offset of the deflection device. In this case, an additional beam offset which corresponds to the beam offset produced by the deflection device in terms of absolute value can be produced by the further deflection device, for example in addition to the lateral offset required for arranging the respective centre of the beam cross sections centrally in the beam offset direction in an area provided for the diffraction. In this case, use can be made of two further deflection devices which offset the laser beam and the laser beam deflected at the deflection device in parallel in the beam offset direction, in each case with the absolute value of the beam offset produced by the deflection device. However, it is possible to this end to use a single further deflection device, for example in the form of a prism or the like, the said single further deflection device also deflecting the laser beam perpendicular to the beam offset direction, that is to say within the diffraction plane, in addition to the beam offset or the lateral offset in the beam offset direction.

In an alternative embodiment, the grating arrangement has a single diffraction grating and a first deflection device for producing a beam offset in a first beam offset direction and a second deflection device for producing a beam offset in the second beam offset direction and preferably in the first beam offset direction, with the first and the second deflection device preferably being arranged on opposite sides of the diffraction grating. In this embodiment, the single diffraction grating of the grating arrangement is passed four times by the laser beam. The two deflection devices allow the laser beam to be incident on the diffraction grating in four different areas. The second deflection device may have one or more deflection elements for producing the beam offset in the first beam offset direction and in the second beam offset direction.

In a development of this embodiment, the second deflection device is designed to produce a lateral offset in the first beam offset direction, preferably in addition to a beam offset which corresponds to the absolute value of the beam offset of the first deflection device in the first beam offset direction, the lateral offset being given by:

$$\Delta H = 1/4 H_G (H_A - H_E)/(H_A + H_E),$$

where $H_G$ denotes the extent of the diffraction grating in the first beam offset direction, $H_E$ denotes the extent of the beam cross section of the laser beam in the first beam offset direction during the first passage through the diffraction grating and $H_A$ denotes the extent of the beam cross section of the deflected laser beam in the first beam offset direction during the last passage through the diffraction grating.

The lateral offset in the first beam offset direction is required, in a manner analogous to the embodiment with the two diffraction gratings described above, in order to ensure that the beam cross section is incident centrally in the first beam offset direction on an area of the diffraction grating provided for the diffraction. In order to ensure this, it is possible, for example, for an edge at which the two reflection surfaces of the first deflection device adjoin one another to be offset by half the lateral offset ($\Delta H/2$) from an edge at which two of the three reflection surfaces of the second deflection device adjoin one another. The second deflection device can be designed to produce a beam offset in the first beam offset direction and additionally produce a lateral offset in the first beam offset direction. However, it is also possible that the second deflection device merely produces a lateral offset but no beam offset in the first beam offset direction, as has been described above in relation to the further deflection device(s) in the embodiment with the two diffraction gratings.

In a further embodiment, an extent in a direction perpendicular to a diffraction plane of the grating arrangement of the beam cross section of the laser beam emerging from the grating arrangement is greater than an extent in the direction perpendicular to the diffraction plane of the beam cross section of the laser beam entering the grating arrangement by a factor of at least 1.5, preferably by at least a factor of 1.7, in particular by a factor of at least 2.0. In the case of a round beam cross section, the extent of the beam cross section in the beam offset direction corresponds to the diameter of the beam cross section or the beam diameter of the laser beam.

The beam cross section or its extent in the direction perpendicular to the diffraction plane, which typically corresponds to the beam offset direction, or a beam offset direction, is measured at the first diffraction grating, more precisely at the diffractive grating structure thereof, of the grating arrangement in the beam path for the entering laser beam. Accordingly, the beam cross section or its extent in the direction perpendicular to the diffraction plane is measured at the last diffraction grating of the grating arrangement in the beam path, which may optionally correspond to the first diffraction grating (see above), for the emerging laser beam. On account of the diverging caustic of the laser beam, the beam cross section of the laser beam continuously increases during the passage through the grating arrangement. Despite a comparatively small divergence angle (see below), the extent of the beam cross section in the grating arrangement generally increases significantly in the direction perpendicular to the diffraction plane, corresponding to the beam diameter in the case of a circular beam cross section, if the diffraction gratings have a comparatively large distance from one another, which may optionally be of the order of metres.

In a further embodiment, the beam-expanding optical element is designed to produce a divergence angle of the laser beam entering the grating arrangement, the said divergence angle being between 0.5 mrad and 100 mrad. The choice of a suitable divergence angle, with which the laser beam enters the grating arrangement, depends on a plurality of parameters, for example on the distance between the diffraction gratings. The divergence angle should not be chosen to be too large, in order to prevent the aberrations or the phase errors from becoming too large during the passage through the grating arrangement as this may lead to a deterioration in the beam quality of the laser beam, especially if the optical arrangement or the grating compressor is operated in the vicinity of the transition to the non-linearity of the diffraction condition. The grating compressor or the grating arrangement can frequently be designed in such a way that there is an acceptable decrease or deterioration in the beam quality without additional measures having to be undertaken in order to improve the beam quality.

In a further embodiment, the optical arrangement has at least one correction device, in particular a phase correction device, for at least partial compensation of a deterioration in a beam quality of the laser beam, the said deterioration being able to be traced back to the divergence of the laser beam when entering into the said grating arrangement.

As described above, the laser beam enters the grating arrangement in collimated fashion in the case of conventional grating compressors. The divergent entrance of the laser beam into the grating arrangement usually leads to a deterioration in the beam quality of the laser beam following the passage through the grating arrangement in comparison with the beam quality of a laser beam entering the grating arrangement in collimated fashion. Within the context of this application, the beam quality of the laser beam is understood to mean the K-factor, for which the following applies: $K=1/M^2$, where $M^2$ denotes the beam quality factor. The correction device typically is a phase correction device since the correction of the phase of the laser beam allows an improvement in the beam quality of the laser beam without light losses. However, in principle it is also possible to use other types of correction devices which correct the phase error in the spatial domain, for example in the form of neutral-density filters, for example in the form of stops, or the like.

In a development, the correction device is arranged upstream of the grating arrangement in the beam path or downstream of the grating arrangement in the beam path. The correction for at least partial compensation of the deterioration in the beam quality can be implemented before or after the passage through the grating arrangement. In particular, it is also possible that a first correction device is arranged in the beam path of the laser beam upstream of the grating arrangement and a second correction device is arranged in the beam path of the laser beam downstream of the grating arrangement. The correction device can also be arranged within the grating arrangement. In the case where the compensation device is arranged within the collimated beam path, the said compensation device can be positioned anywhere therein as a matter of principle. In the case where the correction device is arranged in the divergent beam path and designed as a phase correction device, it is advantageous as a matter of principle for the said correction device to be arranged at a position at which the phase error to be compensated is maximal. In the case where the correction device corrects the phase error in the spatial domain and is designed, for example, as a neutral-density filter, for example in the form of a stop, the correction device should be arranged at a position at which the phase error is minimal.

In a development, the phase correction device is embodied as a diffractive optical element. In principle, the phase correction device may also be embodied differently, for example in the form of a waveplate with a spatially dependently varying phase shift or retardation. However, a phase correction device in the form of a diffractive optical element can be integrated particularly easily into the grating arrangement.

In a development, the phase correction device is integrated into a diffraction grating of the grating arrangement, that is to say into the diffractive structure (grating structure). In this case, the diffractive structure (grating structure) of the diffraction grating is designed so that the latter additionally produces a phase correction in order to counteract a deterioration in the beam quality of the laser beam. In principle, the deterioration in the beam quality of the laser beam which can be traced back to the divergence upon entrance of the laser beam into the grating arrangement and which can be traced back to a respective diffraction grating can be virtually completely corrected by a phase correction device integrated into the said diffraction grating. Phase errors that can be traced back to preceding or subsequent diffractions or diffraction gratings can be partially compensated using such a phase correction device. It is therefore also possible for two or more phase correction devices to be integrated into two or more diffraction gratings. In the case where one and the same diffraction grating is passed at least twice in different areas by the laser beam, the phase correction is suitably adjusted in the respective area. In particular, the diffractive optical element can be integrated into the first diffraction grating of the grating arrangement in the beam path.

The compensation device is required if a deterioration in the beam quality should be counteracted at a given divergence angle, if the beam quality should be increased should the latter not have been optimal upstream of the grating arrangement, or if the beam cross section of the laser beam emerging from the grating arrangement has to be increased in the case of higher pulse peak powers and the beam cross section of the laser beam entering the grating arrangement needs to be reduced accordingly in order not to increase the grating area required.

In particular, the compensation device can be designed to partially compensate the deterioration in the beam quality K in the diffraction direction or in the diffraction plane, in such a way that the beam quality K does not decrease by more than 0.1 when passing through the grating arrangement.

In a further embodiment, the optical arrangement has a collimating device, in particular at least one collimating optical element, for collimating the laser beam following the passage through the grating arrangement. It was found to be advantageous if the grating arrangement is integrated into a beam telescope which is formed by the beam-expanding device and by the collimating device. The beam telescope increases the beam cross section of the collimated laser beam incident on the beam-expanding device, that is to say the laser beam is expanded when passing through the grating arrangement. By way of example, the collimating device may have one or more transmissive optical elements, for example in the form of lenses, and/or one or more reflective optical elements, for example in the form of (curved) mirrors.

In principle, the diffraction grating or gratings of the grating arrangement may have a transmissive or reflective embodiment. In both cases, the required grating area can generally be significantly reduced as a result of the laser beam divergently entering the grating arrangement.

A further aspect of the invention relates to a laser system having a laser source for producing a pulsed laser beam and an optical arrangement, embodied as described above, for pulse compression of the pulsed laser beam. By way of example, the laser system can be an ultrashort pulse system which comprises a laser source for producing spectrally broad laser pulses. By way of example, the laser source can be a laser oscillator but the laser source may also be in the form of a laser oscillator/amplifier combination. Such a laser source has an oscillator, for example a fibre oscillator, for producing laser pulses and an amplifier arrangement for amplifying the laser pulses or the pulsed laser beam, the said amplifier arrangement having one or more optical amplifiers. The laser source may have a pulse stretcher for stretching the pulse durations of the laser pulses. The pulse stretcher may be positioned upstream or within the amplifier arrangement. By way of example, the laser source may be designed to produce laser pulses with spectral widths of for example 1 nm or more and pulse energies of for example 1 mJ or more. In the case of such a laser system, the above-described optical arrangement, more precisely the grating arrangement, may serve as a dispersion adaptation unit for pulse duration compression (also referred to as a pulse compressor).

Further advantages of the invention are evident from the description and the drawing. Likewise, the features mentioned above and those that are yet to be presented can be used in each case by themselves or as a plurality in any desired combinations. The embodiments shown and described should not be understood as an exhaustive enumeration, but rather are of exemplary character for outlining the invention.

In the following description of the drawings, identical reference signs are used for identical or functionally identical components.

FIG. 1a and FIG. 2a show an optical arrangement 1 which has a Treacy-type grating arrangement 2 with a first diffraction grating 3 that is operated in transmission and a second diffraction grating 4 that is operated in transmission, and also with a deflection device 5 in the form of a roof prism. The two diffraction gratings 3, 4 are aligned parallel to one another and diffract a pulsed laser beam 6, which is in the process of passing through the grating arrangement 2, along a YZ-plane of an XYZ-coordinate system, the said plane also being referred to as diffraction plane below. The laser beam 6 is spectrally expanded and spectrally combined in the diffraction plane YZ (or in a plane parallel to the diffraction plane YZ), as indicated in FIG. 1a using dashed lines. After passing through the first and second diffraction grating 3, 4, the laser beam 6 passes through the deflection device 5 and is deflected, more precisely retroreflected, by the latter, with the deflection device 5 producing a beam offset ΔX in a beam offset direction X, aligned perpendicular to the diffraction plane YZ, of the XYZ-coordinate system.

The optical arrangement 1 in FIG. 1a and FIG. 2a serves for the pulse compression of the laser beam 6, as is evident from the pulse shape $P_E$ of the laser beam 6 when entering the grating arrangement 2 and the pulse shape $P_A$ when emanating from the grating arrangement 2. As is evident in FIG. 2a, the laser beam 6 enters the grating arrangement 2 divergently and maintains its divergent beam shape when passing through the grating arrangement 2, that is to say when passing through the first and the second diffraction grating 3, 4 and when passing through the deflection device 5.

To produce the divergence of the pulsed laser beam 6, the optical arrangement 1 has a beam-expanding device, which in the example shown is in the form of a first lens 7, which is arranged in the beam path upstream of the grating arrangement 2. A collimating device in the form of a second lens 8 is arranged in the beam path downstream of the grating arrangement 2. The first and the second lens 7, 8 form a beam telescope for the laser beam 6, which is produced by a laser source not depicted here and which is incident on the first lens 7 in collimated fashion. In the example shown, the first and the second lens 7, 8 are spherical lenses but the use of cylindrical lenses is also possible.

FIG. 1b and FIG. 2b show an optical arrangement 1, in which the grating arrangement 2 has two reflective diffraction gratings 3, 4 instead of two transmissive diffraction gratings 3, 4. Like in the case of the optical arrangement 1 shown in FIG. 1a and in FIG. 2a, the laser beam 6 in the optical arrangement 1 shown in FIGS. 1b and 1n FIG. 2b is incident on the first diffraction grating 3 at an angle with respect to the grating normal in the diffraction plane YZ. In the side view illustrated in FIG. 2b, the angle at which the laser beam 6 is incident on the first diffraction grating 3 and the angle at which the emerging laser beam 6 is reflected at the first diffraction grating 3 are depicted not in the diffraction plane YZ but at an angle to the diffraction plane ZY in order to increase the clarity of the representation of the laser beam 6 propagating between the two diffraction gratings 3, 4. Otherwise, the structure of the optical arrangement 1 shown in FIGS. 1b and 1n FIG. 2b corresponds to the optical arrangement 1, shown in FIG. 1a and in FIG. 2a, with the transmissive diffraction gratings 3, 4.

Figure 3A:
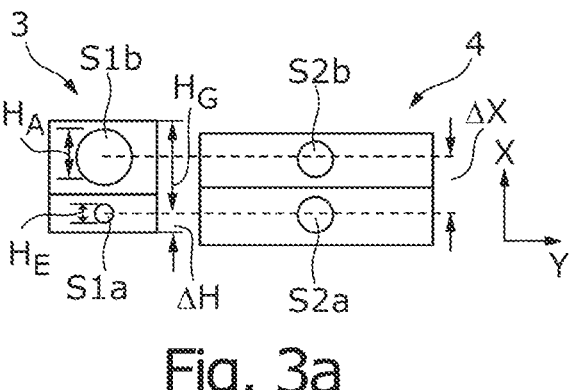
FIGS. 3a-3c show schematic representations of beam cross sections of the divergent laser beam on the two diffraction gratings when passing through the grating arrangement and also of a lateral offset of the two diffraction gratings or of a parallel offset of the laser beam, which is laterally offset by two further deflection devices, according to some embodiments.
Figure 3B:
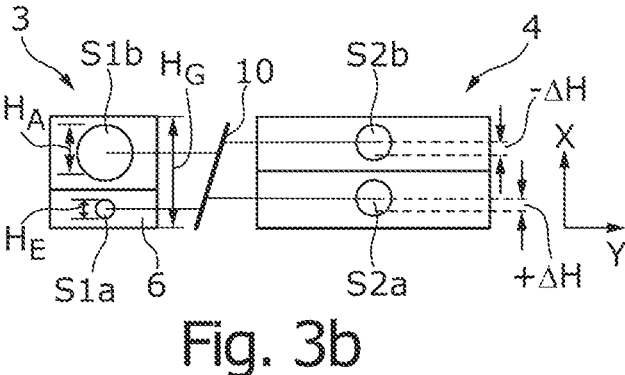
Figure 3C:
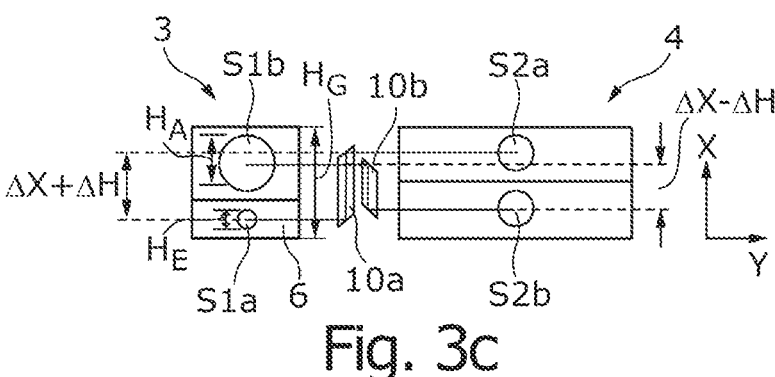

As is evident from FIGS. 3a-3c, which show the two diffraction gratings 3, 4 in a plan view, the size of the beam cross section of the laser beam 6 increases when passing through the grating arrangement 2, to be precise from a minimum extent $H_E$ of a first beam cross section S1a in the beam offset direction X during the first passage through the first diffraction grating 3 via a second and third beam cross section S2a, S2b—practically the same size-when passing through the second diffraction grating 4 to a fourth beam cross section S1b with a maximum extent $H_A$ in the beam offset direction X during the second passage through the first diffraction grating 3. The respective beam cross sections S1a, S1b, S2a, S2b are represented in circular fashion in FIGS. 3a,b because the representation of the spectral fanning and combining of the spectral components of the laser beam 6 in the diffraction plane YZ was dispensed with for reasons of clarity.

The following applies to the ratio between the extent $H_A$ in the beam offset direction X of the beam cross-section S1b of the laser beam 6 emerging from the grating arrangement 2 to the extent $H_E$ in the beam offset direction X of the beam cross section S1a of the laser beam 6 entering the grating arrangement 2: $H_A/H_E \geq 1.5$, preferably $\geq 1.7$, in particular $\geq 2.0$. The increase in the extent of the beam cross section of the laser beam 6 in the beam offset direction X when passing through the grating arrangement 2 is advantageous for the laser resistance of the optical arrangement 1, since the pulse durations of the pulses of the laser beam 6 are shortened, and the pulse peak power is increased in the process, during the propagation in the grating arrangement 2.

As is evident from FIGS. 3a-c, the first diffraction grating 3 and the second diffraction grating 4 have the same extent $H_G$ in the beam offset direction X in the example shown. In the example shown, the beam offset ΔX produced by the deflection device 4 corresponds to half the extent $H_G$ of the second diffraction grating 4 in the beam offset direction X.

As is likewise evident from FIGS. 3a-c, the diverging beam caustic of the laser beam 6 necessitates a lateral offset ΔH in the beam offset direction X in order to position the centre S1a, S2a of the first and the second beam cross section, when first passing through the first and the second diffraction grating 3, 4, and the centre of the third and the fourth beam cross section S1b, S2b, when passing through the first and the second diffraction grating 3, 4 in the reverse direction, centrally in relation to the beam offset direction X, in an area provided for the respective diffraction.

In the example shown in FIG. 3a, the first diffraction grating 3 and the second diffraction grating 4 are offset in relation to one another in the beam offset direction X for the purposes of producing the lateral offset ΔH. The following applies to the lateral offset which allows the central positioning of the centres of the beam cross sections S1a, S1b, S2a, S2b:

$$\Delta H = 1/4 H_G (H_A - H_E)/(H_A + H_E),$$

where $H_E$ denotes the extent of the (first) beam cross section S1a of the laser beam 6 in the beam offset direction X during the first passage through the first diffraction grating 3 and $H_A$ denotes the extent of the (fourth) beam cross section S1*b* of the deflected laser beam 6 in the beam offset direction X during the second passage through the first diffraction grating 3.

In the example shown in FIG. 3*b*, the two diffraction gratings 3, 4 are arranged level in the beam offset direction X. In this case, the lateral offset ΔH is produced by a deflection device 10 in the form of a plane-parallel plate, which is arranged between the first diffraction grating 3 and the second diffraction grating 4 and which is inclined at an angle with respect to the diffraction plane YZ or with respect to the direction of propagation of the laser beam 6 in order to produce the lateral offset ΔH. The further deflection device 10 produces a lateral offset +ΔH of the laser beam 6 with a positive sign in the shown example during the propagation from the first diffraction grating 3 to the second diffraction grating 4. Accordingly, the further deflection device 10 produces a lateral offset −ΔH of the deflected laser beam 6 with the same absolute value but a negative sign.

In the example shown in FIG. 3*c*, a first and a second further deflection device 10*a*, 10*b* are arranged between the first diffraction grating 3 and the second diffraction grating 4. The two further deflection devices 10*a*, 10*b* are in the form of prisms and differ from the further deflection devices 10 shown in FIG. 3*b* in that these, in addition to the lateral offset +ΔH, −ΔH, produce in the beam offset direction X a beam offset corresponding in terms of absolute value to the beam offset ΔX of the deflection device 5 but having the opposite sign.

After passing through the first further deflection device 10*a*, the laser beam 6 is therefore incident on the second diffraction grating 4 with the centre of the second beam cross section S2*a* not with a lateral offset with the absolute value ΔH, but with a lateral offset of ΔH+ΔX. The laser beam 6 is parallelly offset in the negative beam offset direction X by a beam offset −ΔX (cf. the third beam cross-section S2*b*) in the deflection device 5 not illustrated in FIG. 3*c*, before the deflected laser beam 6 is laterally offset with a lateral offset of −ΔH+ΔX at the second further deflection device 10*b*. It is understood that the further deflection devices 10*a*, 10*b* shown in FIG. 3*c* need not necessarily produce the lateral offset +ΔH, −ΔH, but rather that the beam offset ΔX of the deflection device 5 is sufficient if the two diffraction gratings 3, 4 are offset from one another by the lateral offset ΔH, as illustrated in FIG. 3*a*.

In the example shown, the beam-expanding optical element 7 is designed to produce a divergence angle α of the laser beam 6 upon entrance into the grating arrangement 2, the said divergence angle being between 0.5 mrad and 100 mrad. The divergence angle α should not be chosen to be too large since a divergence of the laser beam 6 which is too large leads to a reduction in the beam quality K (or of its reciprocal $1/M^2$), as is evident on the basis of FIG. 4, which shows the deterioration of the beam quality factor $M^2$ as a function of the minimum beam diameter. In the example shown, the beam-expanding optical element 7 is a spherical lens, but this could also be a cylindrical lens which acts in a direction perpendicular to the diffraction plane YZ.

The following relationship applies between the minimum beam radius $w_0$ (or the minimum beam diameter 2 $w_0$), half the divergence angle α/2 and the beam quality factor $M^2$:

$$\alpha/2w_0 = M^2\lambda/\pi,$$

where λ denotes the wavelength of the laser beam 6.

In order to at least partially compensate the deterioration in the beam quality K or $1/M^2$ of the divergent laser beam 6 when passing through the grating arrangement 2, the optical arrangement 1 has a first and second phase correction device 9*a*, 9*b* in the example shown. The first phase correction device 9*a* is arranged in the beam path upstream of the grating arrangement 2, more precisely in the beam path upstream of the beam-expanding optical element in the form of the first lens 7. The first phase correction device 9*a* is a diffractive optical element, but this could also be embodied as a waveplate, for example, or in any other way. The second phase correction device 9*b* likewise forms a diffractive optical element, which is integrated in the first diffraction grating 3, that is to say the grating structure of the first diffraction grating 3 is modified in such a way that there is an additional phase correction, which counteracts a deterioration in the beam quality K of the laser beam 6, during the diffraction of the laser beam 6 at the first diffraction grating 3.

As a result of the two phase correction devices 9*a*, 9*b*, it is possible to partially compensate the deterioration in the beam quality K of the laser beam 6 in the diffraction plane YZ or in the diffraction direction Y, in such a way that the beam quality K does not decrease by more than 0.1 when passing through the grating arrangement.

In principle, a single phase correction device may be sufficient for the phase correction to compensate the deterioration in the beam quality K of the laser beam 6 by the absolute value specified above. By way of example, it may be integrated in the first diffraction grating 3, as illustrated in FIGS. 2*a,b*. It is also possible for the second diffraction grating 4 to have the phase correction device or a further phase correction device. Alternatively or additionally, the phase correction device or a further phase correction device can be arranged in the beam path downstream of the grating arrangement 2.

It is understood that the phase correction device need not necessarily be arranged in the collimated beam path; instead, it can also be arranged in the divergent beam path between the beam-expanding device or optical unit 7 and the colli-mating device 8 or optical unit, for example in the beam path outside of the grating arrangement 2, for example between the beam-expanding device 7 and the first diffraction grating 3 or in the beam path between the first diffraction grating 3 and the collimating device 8. The phase correction device or any other type of correction device for compensating the deterioration in the beam quality K may also be arranged in the beam path between the two diffraction gratings 3, 4 or in the beam path between the second diffraction grating 4 and the deflection unit 5.

It is understood that the optical arrangement 1 need not necessarily have two diffraction gratings 3, 4; instead, it may also have a greater or fewer number of diffraction gratings, which are passed once or multiple times by the laser beam 6.

Figures 4, 5, 6:
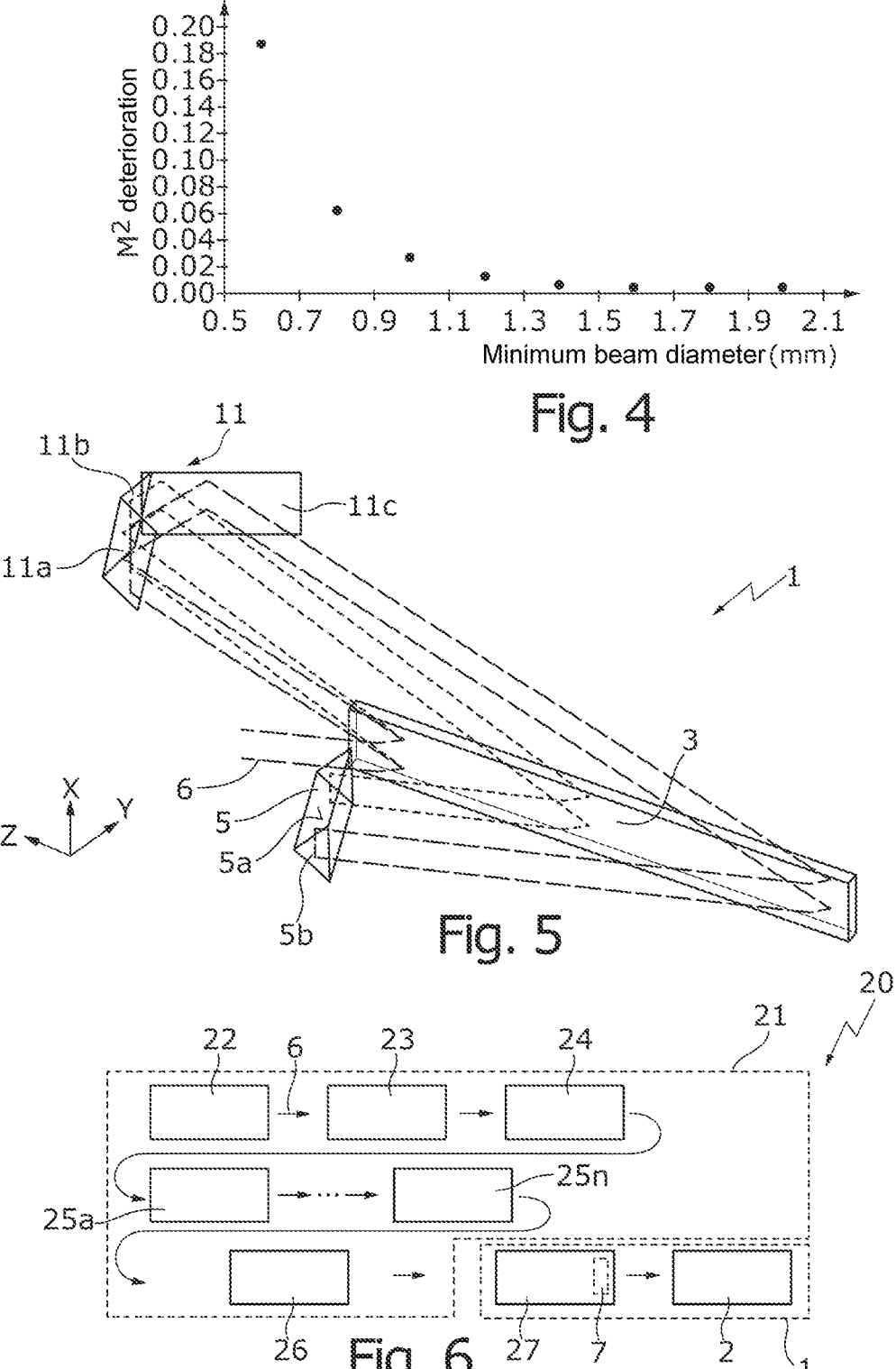
FIG. 4 shows a schematic representation of the deterioration in the beam quality of the laser beam as a function of minimum beam diameter.
FIG. 5 shows a schematic representation of an optical arrangement for pulse compression, having a single diffraction grating and two deflection devices according to some embodiments.
FIG. 6 shows a schematic representation of a laser system, which has a laser source for generating a pulsed laser beam and an optical arrangement for pulse compression of the pulsed laser beam according to some embodiments.

FIG. 5 shows an example of such an optical arrangement 1 with a grating arrangement 2 which has only a single diffraction grating 3. In addition to a first deflection device 5, which is designed like the deflection device 5 shown in FIGS. 1*a,b* or in FIGS. 2*a,b*, the grating arrangement 2 has a second deflection device 11, which is designed to produce a first beam offset ΔX in a first beam offset direction X perpendicular to the diffraction plane YZ, the said first beam offset corresponding to the absolute value of the beam offset ΔX in the first beam offset direction X of the first deflection device 5 but having the opposite sign. The second deflection device 11 is also designed to produce an additional lateral offset +ΔH, −ΔH in the first beam offset direction X, as described in more detail below.

The second deflection device 11 is additionally designed to offset the laser beam 6 in a second beam offset direction Y by a second beam offset ΔY, with the second beam offset direction Y running in the diffraction plane YZ or parallel to the diffraction plane YZ. In order to enable a beam offset ΔX, ΔY in two mutually perpendicular beam offset directions X, Y, the second deflection device 11, which is in the form of a prism group, has three reflection surfaces 11a-c.

The second deflection device 11 additionally produces a lateral offset +ΔH, −ΔH in the first beam offset direction X in order to ensure that an area of the diffraction grating 3 provided for a respective diffraction is struck centrally by the laser beam 6. In this case, the function of the two further deflection devices 10a,b in FIG. 3c is adopted by the second deflection device 11:

After the first diffraction at the diffraction grating 3, the second deflection device 11 produces a beam offset +ΔX and a lateral offset +ΔH, with which the laser beam 6 is incident on the diffraction grating 3 within the scope of the second diffraction. The first deflection device 5 produces a beam offset of −ΔX in the first beam offset direction X, with the result that, within the scope of the third diffraction, the laser beam 6 is incident again on the diffraction grating 3, with the lateral offset +ΔH in relation to the incident laser beam 6. During the second passage through the second deflection device 11, the latter produces a beam offset +ΔX and a lateral offset with a negative sign −ΔH, with the result that, after the fourth diffraction at the diffraction grating 3, the laser beam 6 leaves the grating arrangement 2 with the beam offset +ΔX in relation to the incident laser beam 6.

In order to attain the above-described type of deflection, an edge between the first and second reflection surface 11a, 11b of the second deflection device 11 is positioned offset by −ΔH/2 in the first beam offset direction X in relation to an edge between the two reflection surfaces 5a, 5b of the first deflection device 5. However, it is understood that such positioning of the edges is not mandatory in order to allow the above-described type of deflection.

The first deflection device 5 is arranged at a comparatively short distance from the diffraction grating 3 in order to ensure that the beam cross section of the laser beam 6 remains approximately the same between the second and third diffraction. By contrast, the second deflection device 11 is arranged at a comparatively long distance from the diffraction grating 3.

Unlike what is illustrated in FIG. 5, the second deflection device 11 may be designed to produce a lateral offset +ΔH, −ΔH with the aforementioned absolute value but produce no beam offset ΔX in the first beam offset direction X. In this case, the second deflection device 11 produces a beam offset ΔY in the second beam offset direction Y, which corresponds to the beam offset ΔY shown in FIG. 5. In this case, too, the diffraction grating 3 can be passed four times by the laser beam 6 in different areas.

Should the third reflection surface 11c be dispensed with, the second deflection device 11 shown in FIG. 5 can replace the two further deflection devices 10a,b shown in FIG. 3c because the second deflection device 11 fulfils the same function in view of the first beam offset direction X as the two further deflection devices 10a,b. If the two reflection surfaces 11a,b shown in FIG. 5 are used as a further deflection device 10, then the two diffraction gratings 3, 4 are not aligned parallel to one another but are aligned at an angle with respect to one another, the said angle running in the diffraction plane YZ. The two reflection surfaces 11a, 11b, which may be formed on a further deflection device in the form of a prism, for example, allow the laser beam 6 to be folded in the diffraction plane YZ, and consequently allow a particularly compact structure of the optical arrangement 1.

In FIG. 5, like in FIGS. 1a,b, the fanning of the laser beam 6 in the diffraction plane YZ, more precisely the marginal rays of the fanning, are depicted using dashed lines. The further deflection device 11 can ensure that the laser beam 6 passes through the diffraction grating 3 in four different, mutually offset areas and is diffracted four times in the process. In FIG. 5, like in FIGS. 1a,b, the representation of the beam-expanding element 7 and of the collimating element 8 of the optical arrangement 1 was dispensed with.

The above-described optical arrangement 1 has a compact structure and can be used, for example, as a compressor in a chirped pulse amplification laser system 20, which will be described in more detail below in the context of FIG. 6. However, it is understood that the use of the optical arrangement 1 is not restricted to a chirped pulse amplification system.

The laser system 20 shown in FIG. 6 is an ultrashort pulse system, which has a laser pulse source 21 for producing a laser beam 6 with spectrally broad laser pulses, and the above-described optical arrangement 1 for dispersion adaptation, more precisely for pulse duration compression (which is also referred to as a pulse compressor). By way of example, the laser pulse source 21 can be embodied as a laser oscillator or, as shown in FIG. 6, as a laser oscillator/ amplifier combination.

In the example shown in FIG. 6, a fibre oscillator 22 is integrated in the laser source 21, with a dispersion adaptation unit 23 for producing pulse stretching (which is also referred to as a pulse stretcher), which has a similar structure to the above-described pulse compressor, being integrated in the said fibre oscillator. Alternatively, the dispersion adaptation unit 23 for pulse stretching may also be in the form of a Fibre Bragg Grating (FBG). The laser source 21 also has an amplifier chain with a number n of amplifiers 25a-n. In the example shown in FIG. 6, a module for amplitude and/or phase adaptation 24 is additionally arranged upstream of the amplifier chain 25a, . . . , 25n, the said module possibly also being integrated in the amplifier chain 25a, . . . , 25n.

An optical modulator 26 for selecting pulses or for adapting the amplitude of the laser pulses is arranged downstream of the amplifier chain 25a, . . . , 25n and upstream of the optical arrangement 1 which brings about the pulse compression. A free-beam optical unit 27 has at least one beam-expanding optical element 7, which, as explained above, serves to produce a divergent input beam for the grating arrangement 2. In the laser system 20 illustrated in FIG. 6, laser pulses with spectral widths $P_E$ of for example 1 mm and greater and pulse energies of for example 1 mJ and greater are supplied to the optical arrangement 1, which serves as a dispersion adjustment unit, as input laser beam 6.

In the laser system 20 illustrated in FIG. 6, it is possible to undertake a dispersion adaptation of the beam path in order to undertake a fine adjustment of the pulse duration, as described in DE 10 2016 110 947 A1 by the applicant. In this way it is possible to provide an intensity profile of the laser pulses with a desired pulse duration, for example with the shortest possible pulse duration or pulse duration adapted to a processing method.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical arrangement for pulse compression of a pulsed laser beam, the optical arrangement comprising:
   a grating arrangement comprising a first diffraction grating and a second diffraction grating, wherein the pulsed laser beam passes the first diffraction grating and the second diffraction grating in succession,
   a beam-expanding device comprising at least one beam-expanding optical element for forming a divergent pulsed laser beam that enters the grating arrangement divergently,
   a deflection device for deflecting the pulsed laser beam following a first passage through the first diffraction grating and the second diffraction grating, the deflection device being configured to steer the pulsed laser beam back to the first diffraction grating and the second diffraction grating for a second passage therethrough with a beam offset that runs in a beam offset direction aligned perpendicular to a diffraction plane of the grating arrangement, and
   a further deflection device arranged between the first diffraction grating and the second diffraction grating, wherein the further deflection device is an only deflection device between the first diffraction grating and the second diffraction grating, the further deflection device being configured to produce a lateral offset of the pulsed laser beam in the beam offset direction that runs perpendicular to the diffraction plane of the grating arrangement.

2. The optical arrangement according to claim 1, wherein the deflection device has at least two reflection surfaces for deflecting the pulsed laser beam.

3. The optical arrangement according to claim 1, wherein the deflection device is configured to produce the beam offset in two beam offset directions, and the deflection device has at least three reflection surfaces for deflecting the pulsed laser beam.

4. The optical arrangement according to claim 1, wherein the lateral offset of the pulsed laser beam in the beam offset direction produced by the at least one further deflection device is given by:

$$\Delta H = 1/4 H_G (H_A - H_E)/(H_A + H_E),$$

wherein $H_G$ is an extent of the first diffraction grating in the beam offset direction, $H_E$ is an extent of a beam cross section of the pulsed laser beam in the beam offset direction during the first passage through the first diffraction grating, and $H_A$ is an extent of the beam cross section of the deflected pulsed laser beam in the beam offset direction during the second passage through the first diffraction grating.

5. The optical arrangement according to claim 1, wherein the at least one further deflection device is configured to produce, in addition to the lateral offset, a second beam offset in the beam offset direction, the second beam offset corresponding to an absolute value of the beam offset produced by the deflection device in the beam offset direction.

6. The optical arrangement according to claim 1, wherein an extent in a direction perpendicular to a diffraction plane of a beam cross section of the laser beam emerging from the grating arrangement is greater than an extent in the direction perpendicular to the diffraction plane of the beam cross section of the laser beam entering the grating arrangement by a factor of at least 1.5.

7. The optical arrangement according to claim 1, wherein the beam-expanding device is configured to produce a divergence angle of the laser beam upon entrance into the grating arrangement, the divergence angle being between 0.5 mrad and 100 mrad.

8. The optical arrangement according to claim 1, further comprising: at least one phase correction device for at least partial compensation of a deterioration in a beam quality of the laser beam during a passage through the grating arrangement, the deterioration being able to be traced back to the divergence of the laser beam when entering into the grating arrangement.

9. The optical arrangement according to claim 8, wherein the phase correction device is arranged upstream of the grating arrangement in a beam path or downstream of the grating arrangement in the beam path.

10. The optical arrangement according to claim 8, wherein the phase correction device comprises a diffractive optical element.

11. The optical arrangement according to claim 10, wherein the phase correction device is integrated in the first diffraction grating or the second diffraction grating of the grating arrangement.

12. The optical arrangement according to claim 1, further comprising:
    a collimating device for collimating the laser beam following a passage through the grating arrangement.

13. A laser system, comprising:
    a laser source for producing a pulsed laser beam, and
    an optical arrangement according to claim 1 for pulse compression of the pulsed laser beam.

14. An optical arrangement for pulse compression of a pulsed laser beam, the optical arrangement comprising:
    a grating arrangement comprising a first diffraction grating and a second diffraction grating, wherein the pulsed laser beam passes the first diffraction grating and the second diffraction grating in succession, a beam-expanding device comprising at least one beam-expanding optical element for forming a divergent pulsed laser beam that enters the grating arrangement divergently, and a deflection device configured to steer the pulsed laser beam, after a first passage through the second diffraction grating, back to the second diffraction grating for a second passage therethrough with a beam offset that runs in a beam offset direction aligned perpendicular to a diffraction plane of the grating arrangement, and wherein the first diffraction grating and the second diffraction grating are arranged offset from one another by a lateral offset in the beam offset direction that runs perpendicular to the diffraction plane of the grating arrangement, wherein the lateral offset between the first diffraction grating and the second diffraction grating in the beam offset direction is given by:

$$\Delta H = 1/4 H_G (H_A - H_E)/(H_A + H_E),$$

wherein $H_G$ is an extent of the first diffraction grating in the beam offset direction, $H_E$ is an extent of a beam cross section of the pulsed laser beam in the beam offset direction during the first passage through the first diffraction grating, and $H_A$ is an extent of the beam cross section of the deflected pulsed laser beam in the beam offset direction during the second passage through the first diffraction grating.

15. An optical arrangement for pulse compression of a pulsed laser beam, the optical arrangement comprising:

a grating arrangement comprising one and only one diffraction grating, and a beam-expanding device comprising at least one beam-expanding optical element for forming a divergent pulsed laser beam that enters the grating arrangement divergently, a first deflection device for producing a first beam offset in a first beam offset direction, and a second deflection device for producing a second beam offset in a second beam offset direction orthogonal to the first beam offset direction, the first deflection device and the second deflection device being arranged on opposite sides of the diffraction grating.

16. The optical arrangement according to claim 15, wherein the second deflection device is configured to produce a lateral offset of the pulsed laser beam in the first beam offset direction, the lateral offset being given by:

$$\Delta H = 1/4 H_G (H_A - H_E)/(H_A + H_E),$$

wherein $H_G$ is an extent of the diffraction grating in the first beam offset direction, $H_E$ is an extent of a beam cross section of the laser beam in the first beam offset direction during the first passage through the diffraction grating and $H_A$ is an extent of the beam cross section of the deflected laser beam in the first beam offset direction during the second passage through the diffraction grating.

* * * * *